(12) United States Patent
Sett et al.

(10) Patent No.: US 11,210,337 B2
(45) Date of Patent: Dec. 28, 2021

(54) SYSTEM AND METHOD FOR SEARCHING AUDIO DATA

(71) Applicant: International Business Machines Corporation, Armonk, NY (US)

(72) Inventors: Sujoy Sett, West Bengal (IN); Rizwan Dudekula, Bangalore (IN); Shreeya Joshi, Bangalore (IN); Silpi Dhua, West Bengal (IN)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 16/161,930

(22) Filed: Oct. 16, 2018

(65) Prior Publication Data

US 2020/0117754 A1    Apr. 16, 2020

(51) Int. Cl.
*G06F 17/00* (2019.01)
*G06F 7/00* (2006.01)
*G06F 16/632* (2019.01)
*G06N 20/00* (2019.01)
*G06F 16/638* (2019.01)
*G06F 16/68* (2019.01)

(52) U.S. Cl.
CPC .......... *G06F 16/632* (2019.01); *G06F 16/638* (2019.01); *G06F 16/686* (2019.01); *G06N 20/00* (2019.01)

(58) Field of Classification Search
CPC .... G06F 16/632; G06F 16/638; G06F 16/686; G06N 20/00

USPC ........................................................ 707/706
See application file for complete search history.

(56) References Cited

U.S. PATENT DOCUMENTS

| | | |
|---|---|---|
| 4,181,813 A | 1/1980 | Marley |
| 5,131,043 A | 7/1992 | Fujii |
| 5,495,409 A | 2/1996 | Kanno |
| 5,596,679 A | 1/1997 | Wang |
| 5,638,486 A | 6/1997 | Wang |
| 6,434,520 B1 | 8/2002 | Kanevsky |
| 6,516,312 B1 * | 2/2003 | Kraft ...................... G06F 16/30 707/610 |
| 6,528,715 B1 * | 3/2003 | Gargi ................... G10H 1/0033 84/615 |
| 6,697,796 B2 | 2/2004 | Kermani |
| 6,952,694 B2 | 10/2005 | Mathur |
| 7,684,991 B2 | 3/2010 | Stohr |

(Continued)

*Primary Examiner* — Pavan Mamillapalli
(74) *Attorney, Agent, or Firm* — Troutman Pepper Hamilton Sanders LLP (57) ABSTRACT

An audio search system is configured to perform a native search of one or more audio input files in response to a search query. The audio search system is connected to a corpus of audio files representing words, syllables, and characters that may be found in an audio input file. The audio search system has a memory storing instructions and a processing device configured to execute the instructions to receive a search query for searching one or more audio input files, convert the search query into an audio search expression, identify one or more meta-tags in the audio search expression, select a machine learning model based on the one or more meta-tags, and use the machine learning model to search the one or more audio input files for segments of the audio input file that are results of the search query.

13 Claims, 4 Drawing Sheets

(56) References Cited

U.S. PATENT DOCUMENTS

| | | | |
|---|---|---|---|
| 7,899,976 B2* | 3/2011 | Pandya | G06F 16/90344 |
| | | | 711/103 |
| 7,962,530 B1* | 6/2011 | Kolta | G06F 16/683 |
| | | | 707/805 |
| 7,983,915 B2 | 7/2011 | Knight | |
| 8,024,802 B1 | 9/2011 | Preston | |
| 8,190,663 B2* | 5/2012 | Schnitzer | G06F 16/61 |
| | | | 700/94 |
| 8,396,712 B2* | 3/2013 | Khosla | G10L 15/193 |
| | | | 704/257 |
| 8,577,684 B2 | 11/2013 | Lee | |
| 8,712,776 B2* | 4/2014 | Bellegarda | G10L 13/08 |
| | | | 704/260 |
| 8,831,760 B2 | 9/2014 | Gupta | |
| 9,105,300 B2 | 8/2015 | Resch | |
| 9,336,409 B2 | 5/2016 | Doren | |
| 9,396,256 B2 | 7/2016 | Feng | |
| 9,697,820 B2* | 7/2017 | Jeon | G10L 13/047 |
| 10,121,467 B1* | 11/2018 | Gandhe | G06F 40/284 |
| 2005/0012521 A1 | 1/2005 | Sharangpani | |
| 2006/0031486 A1* | 2/2006 | Miner | G06F 16/48 |
| | | | 709/224 |
| 2007/0282833 A1 | 12/2007 | McMillen | |
| 2008/0154869 A1* | 6/2008 | Leclercq | G06F 16/90328 |
| | | | 707/999.004 |
| 2008/0235283 A1* | 9/2008 | Turnball | G06F 16/637 |
| | | | 707/999.107 |
| 2008/0270342 A1 | 10/2008 | Ruehle | |
| 2011/0029561 A1* | 2/2011 | Slaney | G06F 16/58 |
| | | | 707/772 |
| 2012/0143907 A1* | 6/2012 | Turnbull | G06F 16/637 |
| | | | 707/769 |
| 2014/0067374 A1* | 3/2014 | Wilkins | G06F 16/685 |
| | | | 704/9 |
| 2014/0095166 A1* | 4/2014 | Bell | G10L 19/018 |
| | | | 704/270 |
| 2016/0034573 A1 | 2/2016 | Mayo | |
| 2017/0092259 A1* | 3/2017 | Jeon | G10L 13/07 |

* cited by examiner

SYSTEM AND METHOD FOR SEARCHING AUDIO DATA

TECHNICAL FIELD

The present application relates generally to searching of audio data and, more particularly, to natively searching for specified audio segments within a corpus of audio files.

BACKGROUND

There are many methods to perform text searching, but very few methods for searching audio data. Typical solutions involve converting audio to text and text searching the results for matching segments of the converted text. However, these processes are not convenient and suffer from drawbacks. For example, audio-to-text conversion processes may produce mistakes that affect the results. Moreover, even after matching text is found, time markers must be matched back to the audio to find the matching segment of the audio.

The present disclosure is directed to overcoming these and other deficiencies associated with current tools for searching audio.

SUMMARY

In one aspect, the present disclosure describes a computer-implemented method for searching one or more audio input files. The method includes receiving a search query for searching one or more audio input files, converting the search query into an audio search expression, identifying one or more meta-tags in the audio search expression, selecting a machine learning model based on the one or more meta-tags, and using the machine learning model to search the one or more audio input files for segments of the audio input file that are results of the search query.

In another aspect, the present disclosure describes an audio search system. The audio search system is connected to a corpus of audio files representing words, syllables, and characters that may be found in an audio input file. The audio search system has a memory storing instructions and a processing device configured to execute the instructions to receive a search query for searching one or more audio input files, convert the search query into an audio search expression, identify one or more meta-tags in the audio search expression, select a machine learning model based on the one or more meta-tags, and use the machine learning model to search the one or more audio input files for segments of the audio input file that are results of the search query.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present disclosure describes an audio search system configured to search one or more audio files based on a search query. The audio search system natively searches one or more audio files based on comparison between an audio search expression and a corpus of information trained for searching audio. The audio search expression may be similar to a regular text expression that may be used to search text, but with different capabilities and functionality in order to search audio input. The corpus may include words, syllables, and characters that are found in the audio files. These corpus members may have associated audio recordings that enable audio matching to input audio files for finding relevant sections of the audio file.

The corpus may further include categorization of each corpus member to account for variations in the manner that a word is spoken. For example, words that are spoken as words may be categorized differently than abbreviations or acronyms. Where a combination of letters may be spoken in alternative ways, a corpus member may be placed in two categories, with the categories being weighted for likelihood of a match. The corpus may further include meta-tags that become associated with corpus members and serve as a mechanism for custom filtering of corpus members and forming a more robust relationship with the audio search expression. The meta-tags allow a machine learning model to be formed out of some of the corpus members. The machine learning model may be used to perform a search of an audio file using an audio search expression, based on the corpus.

Figure 1:
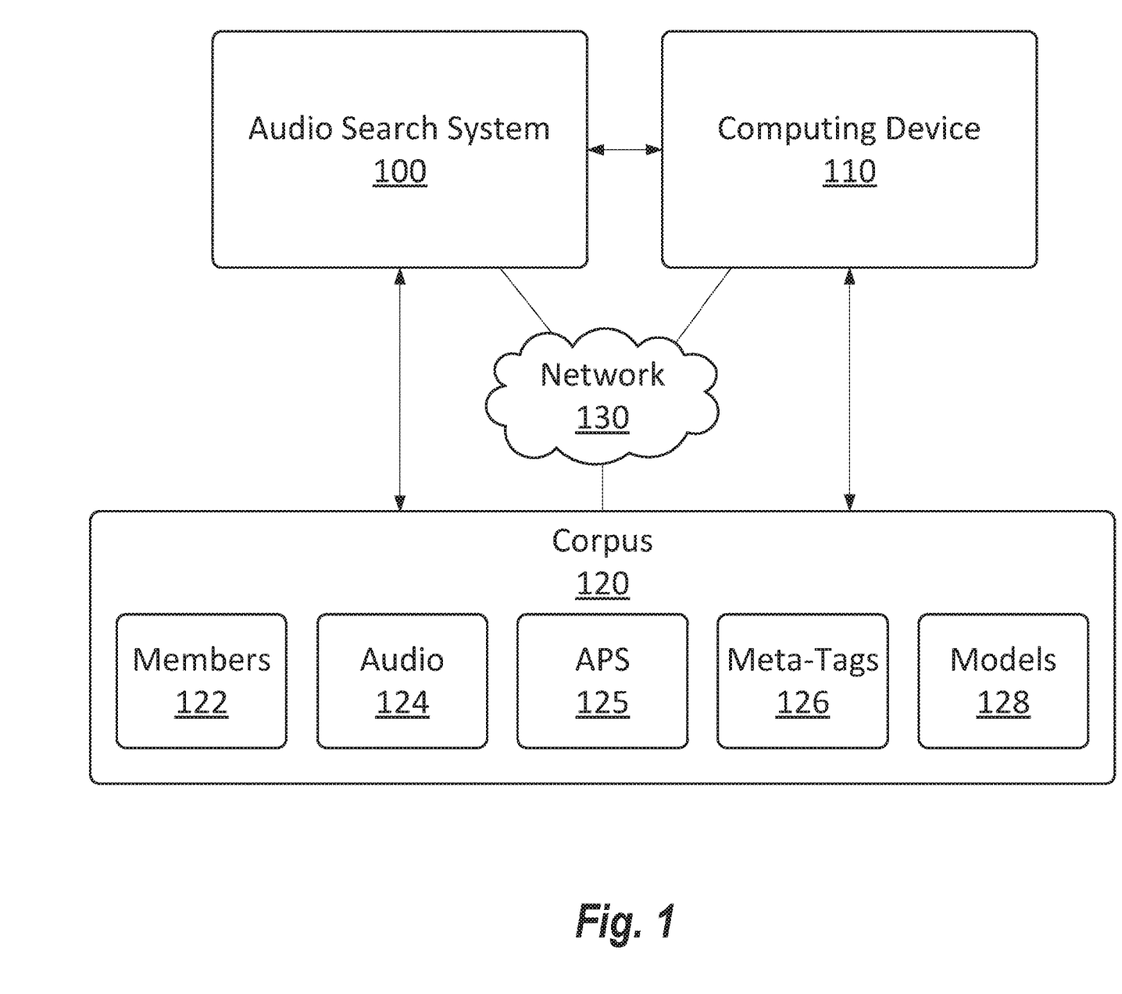
FIG. 1 depicts a schematic diagram of an audio search system in a computer network.

FIG. 1 is an exemplary illustration of a computing system that may be used to implement audio searching consistent with the disclosed embodiments. The computing system may include, for example, an audio search system 100, a computing device 110, and a corpus 120. The audio search system 100, the computing device 110, and the corpus 120 may be connected by a network 130. While shown as separate components, it should be understood that a stand-alone device may encompass one or more of the described elements.

The audio search system 100 may be a computing device specially configured to perform audio searching. The audio search system 100 may be a server connected to the network 130 and configured to receive information from the computing device 110 and the corpus 120. The audio search system 100 may include data processing and data storage elements. The audio search system 100 may include one or more search modules or engines that perform one or more task related to the disclosed embodiments. For example, the audio search system may include a module or engine that receives and breaks down an audio search expression and a separate module or engine that compares the audio search expression to an audio file.

The computing device 110 may be a data processing component configured to perform one or more tasks related to searching of an audio file. For example, the computing device 110 may be a client device (e.g., laptop, mobile device, etc.) associated with a user and configured to receive a search query as input and provide the search query to the audio search system 100 for searching of an audio file. In some embodiments, the computing device 110 may additionally or alternatively provide the audio file or files to be searched using a disclosed audio searching process. For example, the computing device 110 may store one or more audio files to be searched and provide audio data to the audio search system 100 during a search operation.

The corpus 120 may be a data storage element configured to store information that may be used in an audio searching process performed by the audio search system 100. For example, the corpus 120 may store a plurality of corpus member 122 in a database or other storage element. The corpus contains a plurality of dictionary words, syllables, and characters (letters and numbers) that may be found in one or more languages. The corpus 120 may be language-specific or may include members 122 that span multiple languages.

The corpus 120 further associates various data with each member 122 in order to allow the members 122 to be used in an audio searching process. For example, the corpus 120 further includes audio files 124, audio pronunciation style (APS) tags 125, and meta-tags 126. The audio files 124 include audio pronunciations (one or more) for each of the members 122. The audio pronunciations may be associated with the different ways that a word or group of characters may be spoken aloud.

Each audio pronunciation in the audio files 124 may include an associated APS tag 125. The APS tag 125 represents the manner in which the word or group of characters is or could be spoken. For example, the tag "w" may be used for worded pronunciation (e.g., normal pronunciation of a word), the tag "s" may be used for syllabic pronunciation (such as a non-dictionary word (e.g., a company name) that would be sounded-out in speech or combination words that include pronounced letters and words), and the tag "c" may be used for character pronunciation (e.g., abbreviations, acronyms, numbers, etc.). Each member 122 may therefore have multiple audio files 124, and each audio file 124 may have one or more APS tags 125 to further characterize the different pronunciation styles. For members 122 and/or audio files 124 that include more than one APS tag 125, the APS tag 125 may be weighed based on the likelihood of that pronunciation to be found. For example the member "USA" may include an audio file 124 associated with the pronunciation of the letters U-S-A and an APS tag "c" because this word is always spoken as an abbreviation. In another example, the word "Qnet" could be stated as "queue net" (with a "s" APS tag), "knet or ki-net" (with an "w" APS tag) or "queue-en-ee-tee" (with a "c" APS tag). These APS tags 125 may be weighted such that the "s" tag having high confidence, the "c" tag having medium confidence, and the "w" tag having low confidence.

The corpus 120 may further include meta-tags 126 associated with one or more of members 122. The meta-tags 126 are a way to create machine learning models 128 out of some of the members 122 of the corpus 120, optionally filtered by the APS tags 125. The system may include base line meta-tags 126 that are intuitive and originally built-in to the computing system and may learn more meta-tags 126 through the models 128. Moreover, the models 128 may be used by the audio search system 100 to perform an actual audio search. For example, the models 128 may inform the audio search system 100 how to compare the members 122 of the corpus 120 to the audio file and identify matches that produce results of the search.

The network 130 may be a local or global network and may include wired and/or wireless components and functionality which enable communication between the audio search system 100 and the computing device 110. The network 130 may be embodied by the Internet, provided at least in part via cloud services, and/or may include one or more communication devices or systems which enable data transfer to and from the systems and components of the audio search system 100 and the computing device 110.

In accordance with some exemplary embodiments, the elements of audio search system 100 or the related components include logic implemented in specialized hardware, software executed on hardware, or any combination of specialized hardware and software executed on hardware, for implementing the audio search system 100 or related components. In some exemplary embodiments, the audio search system 100 may be or include the IBM Watson™ system available from International Business Machines Corporation of Armonk, N.Y., which is augmented with the mechanisms of the illustrative embodiments described hereafter.

Figure 2:
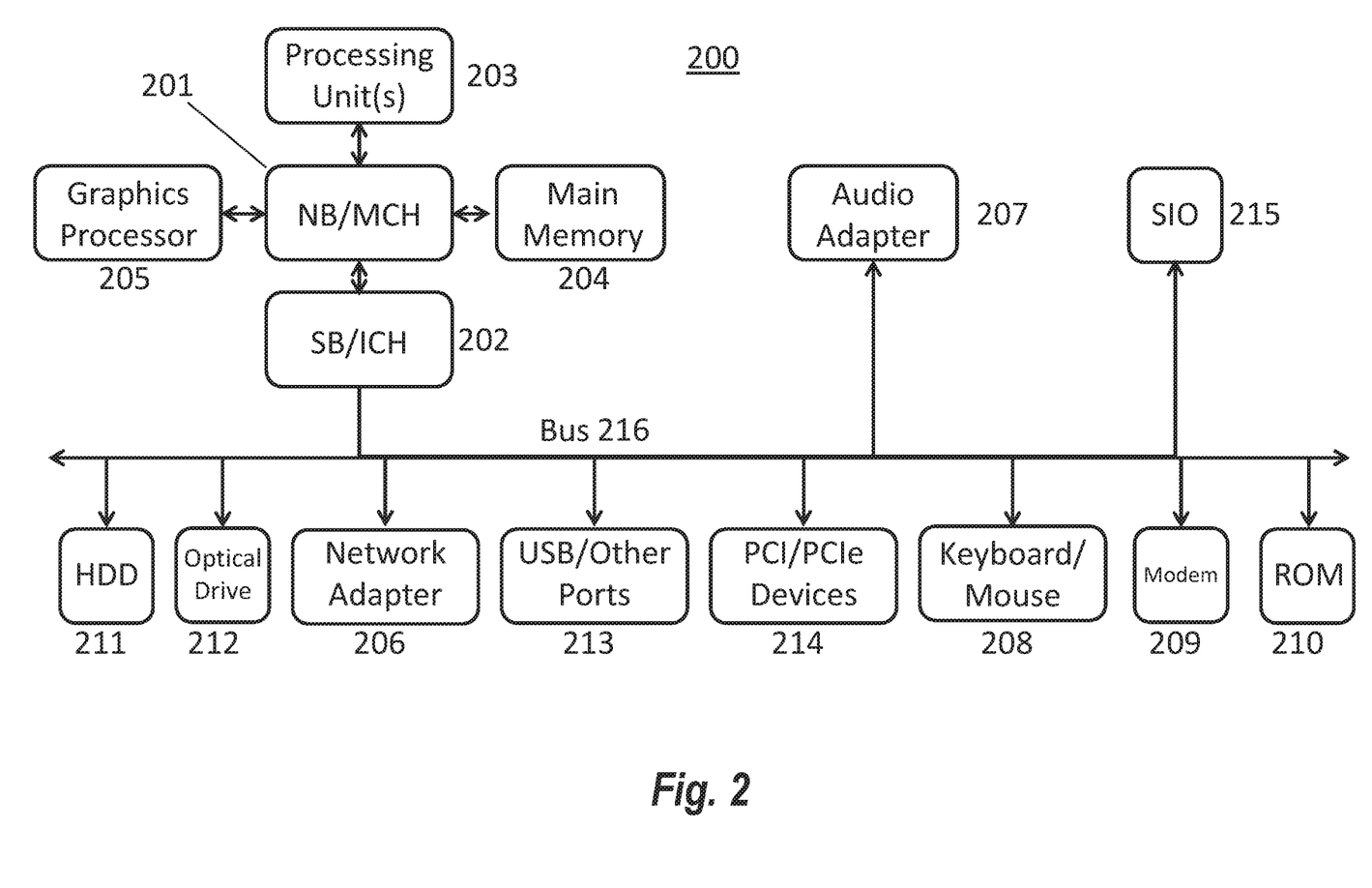
FIG. 2 is a block diagram of an example data processing system in which aspects of the illustrative embodiments are implemented.

FIG. 2 is a block diagram of an example data processing system 200 in which aspects of the illustrative embodiments are implemented. Data processing system 200 is an example of a computer in which computer usable code or instructions implementing the process for illustrative embodiments of the present invention are located. In the depicted example, data processing system 200 can employ a hub architecture including a north bridge and memory controller hub (NB/MCH) 201 and south bridge and input/output (I/O) controller hub (SB/ICH) 202. Processing unit 203, main memory 204, and graphics processor 205 can be connected to the NB/MCH 201. Graphics processor 205 can be connected to the NB/MCH 201 through an accelerated graphics port (AGP).

In the depicted example, the network adapter 206 connects to the SB/ICH 202. The audio adapter 207, keyboard and mouse adapter 208, modem 209, read only memory (ROM) 210, hard disk drive (HDD) 211, optical drive (CD or DVD) 212, universal serial bus (USB) ports and other communication ports 213, and the PCI/PCIe devices 214 can connect to the SB/ICH 202 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. The super I/O (SIO) device 215 can be connected to the SB/ICH 202.

An operating system can run on processing unit 203. The operating system can coordinate and provide control of various components within the data processing system 200. As a client, the operating system can be a commercially available operating system. An object-oriented programming system, such as the Java™ programming system, may run in conjunction with the operating system and provide calls to the operating system from the object-oriented programs or applications executing on the data processing system 200. As a server, the data processing system 200 can be an IBM® eServer™ System P® running the Advanced Interactive Executive operating system or the Linux operating system. The data processing system 200 can be a symmetric multiprocessor (SMP) system that can include a plurality of processors in the processing unit 203. Alternatively, a single processor system may be employed.

Instructions for the operating system, the object-oriented programming system, and applications or programs are located on storage devices, such as the HDD 211, and are loaded into the main memory 204 for execution by the processing unit 203. The processes for embodiments of the website navigation system can be performed by the processing unit 203 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or network adapter 206 can include one or more devices that can be used to transmit and receive data.

Those of ordinary skill in the art will appreciate that the hardware depicted in FIG. 2 may vary depending on the implementation. For example, the data processing system 200 includes several components which would not be directly included in some embodiments of the audio search system 100. However, it should be understood that an audio search system 100 may include one or more of the components and configurations of the data processing system 200 for performing processing methods and steps in accordance with the disclosed embodiments.

Moreover, other internal hardware or peripheral devices, such as flash memory, equivalent non-volatile memory, or optical disk drives may be used in addition to or in place of the hardware depicted. Moreover, the data processing system 200 can take the form of any of a number of different data processing systems, including but not limited to, client computing devices, server computing devices, tablet computers, laptop computers, telephone or other communication devices, personal digital assistants, and the like. Essentially, data processing system 200 can be any known or later developed data processing system without architectural limitation.

Figure 3:
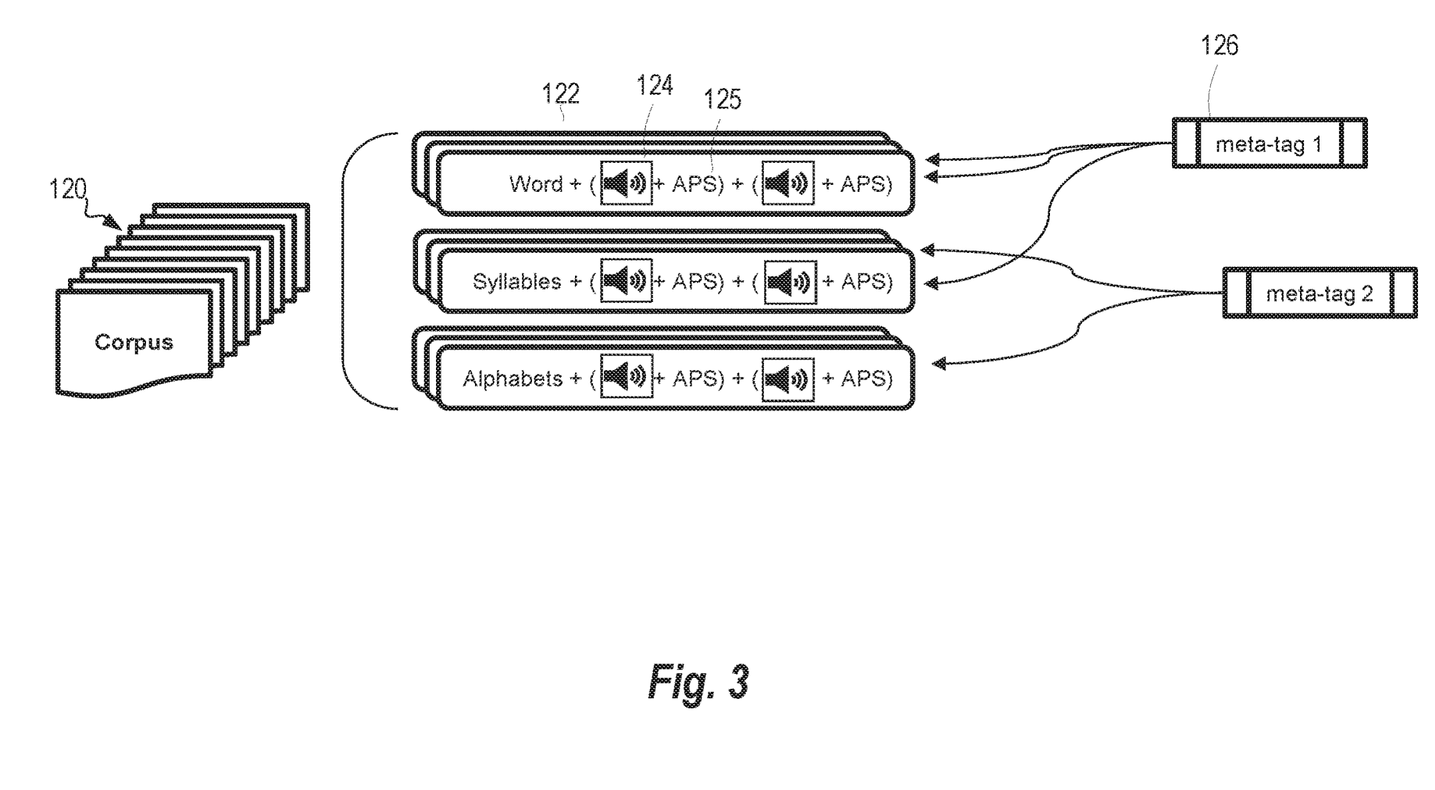
FIG. 3 further depicts details of a corpus that may be used in conjunction with the audio search system.

FIG. 3 is a diagram further illustrating the corpus 120. The members 122 of the corpus 120 each have an audio file 124 and are categorized with an APS tag 125. The audio files 124 may be broken down into a spectrogram that may be used as a comparison tool when searching an audio file. Each spectrogram is stored in the corpus 120 for use during a search.

Each member 122 is also associated with one or more meta-tags 126. The meta-tags 126 enrich the members 122 by further allowing categorization that could be used when breaking down an audio search expression. In one example, meta-tags 126 may be manually created and assigned by users. For instance, a "street name" meta-tag 126 may be created to cover words such as "street, road, avenue, etc."). Users may individually select members 122 for certain meta-tags 126, or could use conventional text searching, synonym searching, neighbor statistics, prefix or suffix information, etc. to find members 122 to be associated with a particular meta-tag 126. The audio search system 100 may include a custom tool for applying meta-tags 126 to members 122 of the corpus 120. When allotting members 122 to meta-tags 126, a user may utilize the custom tool to optionally assign APS tags 125.

The audio search system 100 is preferably configured to create a machine learning model based on information in the corpus 120, including the members 122, APS tags 125, and meta-tags 126. The audio search system 100 may create a model that performs a certain search function when a particular audio search expression is received. For example, the model may be configured to match members 122 to segments of an audio file, based on APS tags 125 and meta-tags 126 that inform the model and process.

Figure 4:
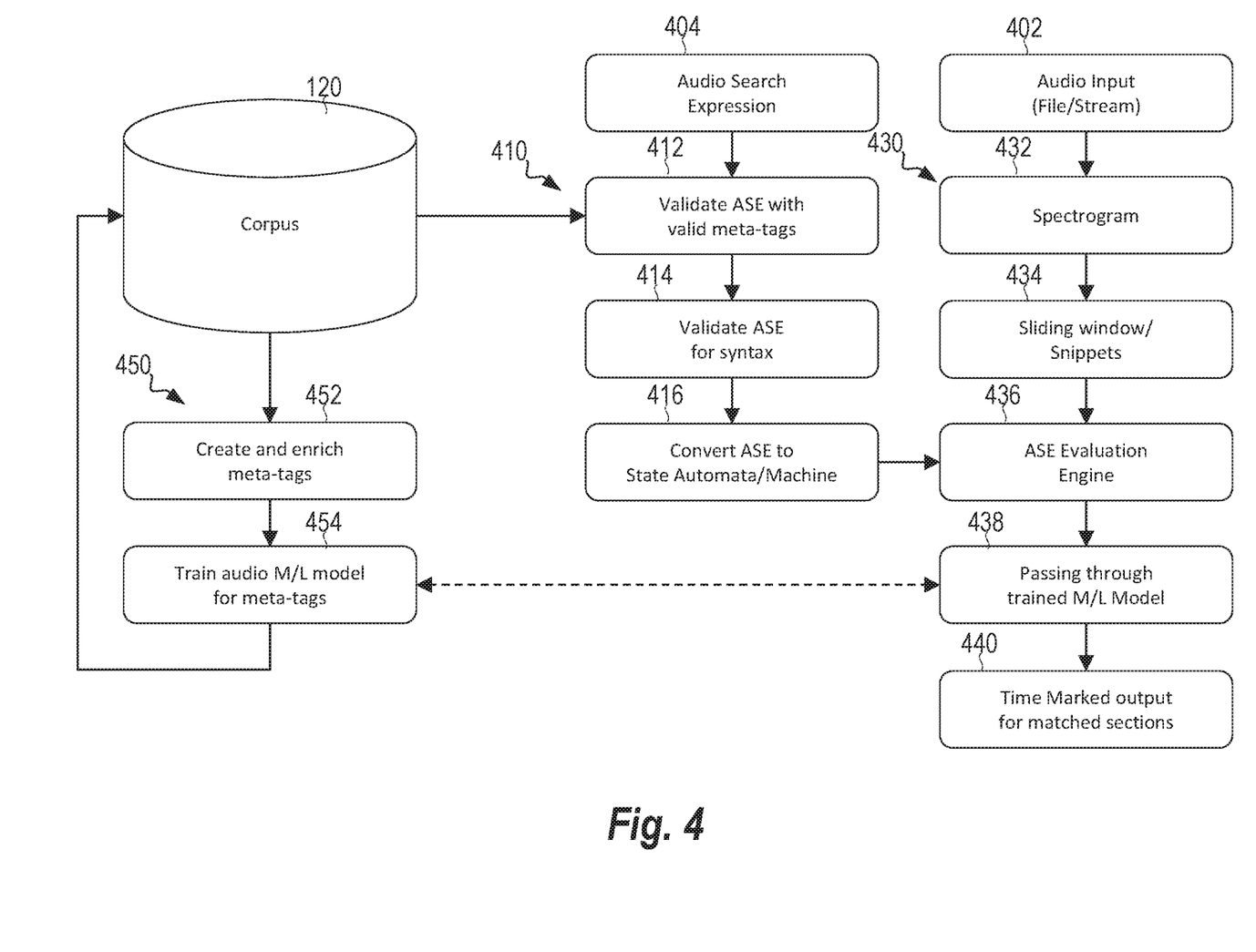
FIG. 4 further depicts an exemplary overall process flow for the audio search system.

FIG. 4 is an overall flow process that may be performed by the audio search system 100 in order to search an audio input file 402 based on an audio search expression 404. In one embodiment, the audio input file 402 is a single audio file to be searched. In another embodiment, the audio input file is a group of audio files to be searched.

The overall process includes sub-routines or methods which interrelate in order to perform individual searches and enhance the system for future searches. The overall process includes, for example, an expression analysis process 410, an audio input analysis process 430, and a machine learning process 450. The audio search system 100 may perform these processes and/or other components connected to the audio search system 100 may perform one or more of the described steps. For example, the computing system 110 may perform one or more steps of the processes 410, 430, 450.

The expression analysis process 410 is a process by which a search query is broken down into a form that may be used to search the audio. The computing device 110 may receive the search query through an input device. The search query may be in the form of a textual request or an audio request. The computing device 110 may provide the search query to the audio search system 100. The audio search system 100 coverts the search query into an audio search expression 404. The audio search expression 404 is in a form that will allow the audio search system 100 to search the audio input file 402 (or plurality of audio files 402) for matching information, such as time markers in the audio input file 402 associated with a result that matches the search query.

The audio input analysis process 430 is a process by which the audio search system 100 configures an audio input file 402 for searching by the disclosed methods. In previous audio search capabilities, an audio file would be converted to text using a speech-to-text function and the text would be searched. According to the disclosed embodiments, the audio input analysis process 430 is a process that prepares the audio file for native searching as audio data.

The machine learning process 450 is a process by which the corpus 120 is enhanced through further searching processes that use the models 128 in the corpus 120 and/or which add new models 128 and/or meta tags 126. The machine learning process 450 can be trained on the data in the corpus 120 and any additional information that is added by users. The machine learning process 450 is further trained on search results and any corrections to search results that may be manually entered into the search system 100.

In the expression analysis process 410, the audio search expression 404 is checked for valid meta-tags (step 412) and the syntax is validated (step 414). These steps are conceptually similar a textual search expression analysis, are specially designed for the audio search process of the audio search system 100. In order to validate the meta-tags in the audio search expression 404, the audio search system 100 may check the meta-tags in the audio search expression 404 against meta-tags 126 stored in the corpus 120. If valid meta-tags are found, the process may move to step 414. If any meta-tags cannot be validated, they may be ignored or more information may be necessary. In step 414, the syntax of the audio search expression 404 is reviewed by the audio search system 100 and a determination is made regarding whether the audio search expression is in a proper format to perform a search. If correct syntax is found, the process flow continues. Improper syntax may be automatically corrected based on one or more stored rules or more information may be requested from a user.

After a valid audio search expression is established, it may be converted to a form that allows the audio search system 100 to perform a matching analysis against the audio input file 402. For example, the audio search expression 404 may be converted to State Automata/Machine data (step 416) to be fed to an evaluation engine.

In the audio input analysis process 430, the audio search system 100 receives the audio input file 402 and creates a spectrogram (step 432) and also divides the audio input file 402 into segments using a sliding window approach (step 434). Each segment may include associated time markers that may be stored in association with the spectrogram. In this way, the audio input file 402 is in a form for native searching in comparison to an audio search expression 404.

The audio search system 100 is further configured (in step 436) to evaluate the segmented spectrogram information based on the converted audio search expression (from step 416). The audio search system 100 utilizes an audio search expression (ASE) evaluation engine in order to review the audio search expression 404 and prepare for the comparison to the audio input file 402.

In step 438, the audio search system 100 uses a machine learning model to compare the audio search expression 404, the audio input file 402, and the corpus members 122. In step 440, the audio search system 100 produces time-marked output corresponding to the results of the search.

The machine learning process 450 includes the audio search system 100 producing additional meta-tags 126 for corpus members 122 and models 128 for use in evaluating an audio search expression 404 during an audio search. For example, the machine learning process 450 may include the creation and enriching of meta-tags 126 (step 452) and the training of machine learning models 128 based on the meta-tags 126 (step 454). The machine learning models 128 are used by the audio search system 100 in order to identify search results (i.e., step 440).

In an exemplary embodiment, each meta-tag 126 may include an association with a machine learning model 128. In this way, the audio search system 100 may identify meta-tags 126 in an audio search expression 404 and use the associated model 128 to perform a search process to parse the audio input file 402 and identify matching results. The corpus members 122 with meta-tags 126 are separated out and the corresponding audio files 124 (filtered by APS tags 125, if applicable) are used to train the machine learning model 128 for that particular meta-tag 126. During the machine learning training process, weights may be assigned to audio inputs based on the confidence assigned to the APS tag 125. The physical breadth and span of the machine learning module may be dynamically determined based on the number of members belonging to a particular meta-tag 126. As an example, if multi-layer-perceptrons are used, the number hidden layers and hidden nodes has to be dependent on the variation of input. Various machine learning algorithms may be used to train models 128 for each meta-tag 126, including one or more audio recognition models 128.

An example of an audio search that may be performed by the audio search system 100 is a search query that asks for any audio that includes a specific address—e.g., 221B Baker Street. The computing device 110 receives this search query and forwards it to the audio search system 100. The audio search system 100 converts the search query into an audio search expression, including meta-tags and syntax that enable the audio search system 100 to perform a search of one or more audio files for the address.

In general, an address is generalized as a number, followed by an optional character, followed by one or more words, and a street synonym. As a result the following exemplary meta-tags 126 may be implicated in order for the audio search system 100 to search for the address: an "all_number" meta-tag selects all numbers as members 122 in the corpus 120, a "single_char" meta-tag selects all individual letters as members 122, and a "road_synonym" meta-tag selects all synonyms of the street suffixes, such as street, road, avenue, etc. The meta-tags 126 may be further filtered by APS tags 125.

After the audio search system 100 identifies the meta-tags 126 for a particular audio search expression 404, the audio search system 100 may also create a syntax for the audio search expression. The syntax for the audio search expression 404 may be conceptually similar to the syntax for textual searching, but the mechanisms are different because the matching processes are quite different. For example, numbers and ranges may be separated (e.g., placed in brackets) to match meta-tagged corpus members 122 in a specific number of times or range of number of times. A question mark "?" may be used as a quantifier. A "*" character may be used to represent an OR condition. Grouping with parentheses may be used upon meta-tagged corpus members 122. Other characters (e.g., "^" and/or "$") may be used to identify start and end points of a particular audio search expression and/or segment of an audio search expression 404.

An example of an audio search expression 404 for finding the address 221 Baker street may be "(\all_number){1,5} (\single_char)? (\corpus){1,3}(\road_synonym). The meta-tag "corpus" is a global meta-tag indicating that all members 122 may be considered. In an audio search performed by the audio search system 100, the audio search system 100 may review segments of one or more audio files for numbers within the range 1-5, single characters, grouping of 1-3 words followed by a road_synonym. The audio search system 100 may perform this analysis by comparing the spectrogram associated with corpus members 122 having the associated meta-tags 126 to the spectrogram snippets that were identified from the audio input file 402. In this way, the audio search system 100 may identify matching information in the one or more audio files and produce time markings that match the results.

Each meta-tag 126 may have specific instructions associated with their model 128 that is used when searching. For example, the "corpus" meta-tag (e.g., (\corpus)) may also function differently from other meta-tags 126 in that it may be used to skip members 122 before moving on to the next meta-tag 126. In other words, the audio search system 100 may use more specific meta-tags 126 (e.g., numbers, street synonyms) first in order to narrow down possible candidates before looking for more global words such as the street name "Baker". Applying a weighting or priority to the meta-tags 126 is more efficient that applying machine-learning on all possible members 122. A different meta-tag 126 (e.g., (\corpus_train)) may be used in place of (\corpus) when it is desired to match all members 122 of the corpus 120.

The audio search system 100 of the present disclosure is a system for natively searching one or more audio files for portions of the audio that match a search query. The system converts the search query into an audio search expression that is in a format that allows one or more machine learning models to be identified. These machine learning models may be used to find portions of the audio that are results of the search query. For example, a search query may look for all personal identifying information (PII) in the one or more audio files (e.g., such that the PII can be extracted or removed from the audio). The audio search system thus provides a more efficient and effective manner for searching audio over present methods of manually listening to audio or converting audio to text and searching the resulting transcript.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The system and processes of the Figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer-implemented method for searching audio data, in a data processing system comprising a processing device and a memory comprising instructions which are executed by the processor, the method comprising:
    receiving a search query for searching one or more audio input files;
    converting the search query into an audio search expression;
    identifying one or more meta-tags in the audio search expression;
    validating a syntax of the audio search expression to determine whether the audio search expression is in a predetermined format;
    correcting the audio search expression to be in the predetermined format if the audio search expression is not in a predetermined format;
    converting the audio search expression into machine data;
    selecting a machine learning model based on the one or more meta-tags; and
    using the machine learning model to search the one or more audio input files to obtain segments of the one or more audio input files that are results of the search query, wherein the machine learning model matches members of a corpus to the segments of the one or more audio input files, wherein the corpus includes a plurality of corpus members, each corpus member having an associated audio file including a pronunciation of the corpus member.

2. The method of claim 1, wherein the audio file of each corpus member is a spectrogram.

3. The method of claim 1, wherein each corpus member has an associated audio pronunciation style (APS) tag representing a manner in which each corpus member is spoken.

4. The method of claim 3, wherein the APS tag is a word tag for worded pronunciation, a syllable tag for syllabic pronunciation, or a character tag for character pronunciation.

5. The method of claim 1, further comprising analyzing the one or more audio input files, comprising converting each audio input file into a spectrogram and separating the audio input file into segments using a sliding window approach.

6. The method of claim 1, further comprising identifying one or more time markers associated with a result of the search query found in one or more of the audio input files.

7. The method of claim 1, wherein the audio search expression includes numbers or data ranges, wherein the numbers or data ranges are separated from each other by one or more brackets.

8. An audio search system, comprising:
    a processing device and a memory comprising instructions which are executed by the processor to:
        receive a search query for searching one or more audio input files;
        convert the search query into an audio search expression;
        identify one or more meta-tags in the audio search expression;
        validate a syntax of the audio search expression to determine whether the audio search expression is in a predetermined format;
        correct the audio search expression to be in the predetermined format if the audio search expression is not in a predetermined format;
        convert the audio search expression into machine data;
        select a machine learning model based on the one or more meta-tags; and
        use the machine learning model to search the one or more audio input files to obtain segments of the one or more audio input files that are results of the search query, wherein the machine learning model matches members of a corpus to the segments of the one or more audio input files, wherein the corpus includes a plurality of corpus members, each corpus member having an associated audio file including a pronunciation of the corpus member.

9. The system of claim 8, wherein the audio file of each corpus member is a spectrogram.

10. The system of claim 8, wherein each corpus member has an associated audio pronunciation style (APS) tag representing a manner in which each corpus member is spoken.

11. The system of claim 10, wherein the APS tag is a word tag for worded pronunciation, a syllable tag for syllabic pronunciation, or a character tag for character pronunciation.

12. The system of claim 8, wherein the processing device is further configured to analyze the one or more audio input files, comprising converting each audio input file into a spectrogram and separating the audio input file into segments using a sliding window approach.

13. A computer program product for performing an audio search, the computer program product comprising a computer readable storage medium having program instructions embodied therewith, the program instructions executable by a processor to cause the processor to:

receive a search query for searching one or more audio input files;

convert the search query into an audio search expression;

identify one or more meta-tags in the audio search expression;

validate a syntax of the audio search expression to determine whether the audio search expression is in a predetermined format;

correct the audio search expression to be in the predetermined format if the audio search expression is not in a predetermined format;

convert the audio search expression into machine data;

select a machine learning model based on the one or more meta-tags; and use the machine learning model to search the one or more audio input files to obtain segments of the one or more audio input files that are results of the search query, wherein the machine learning model matches members of a corpus to the segments of the one or more audio input files, wherein the corpus includes a plurality of corpus members, each corpus member having an associated audio file including a pronunciation of the corpus member.

* * * * *